United States Patent [19]

Makati et al.

[11] Patent Number: 4,742,108

[45] Date of Patent: May 3, 1988

[54] STRUCTURE REINFORCED LATEX PARTICLES

[75] Inventors: Ashok C. Makati; Mezzie L. Ash; Do I. Lee, all of Midland, Mich.

[73] Assignee: The Dow Chemical Company, Midland, Mich.

[21] Appl. No.: 78,328

[22] Filed: Jul. 27, 1987

Related U.S. Application Data

[62] Division of Ser. No. 759,994, Jul. 29, 1985.

[51] Int. Cl.$^4$ ................................................. C08F 2/16
[52] U.S. Cl. .................................. 524/458; 523/201; 524/461; 525/902
[58] Field of Search ................ 523/201; 524/458, 461; 525/902

[56] References Cited

U.S. PATENT DOCUMENTS 4,289,823  9/1981  Arkens ................................. 525/902
4,537,916  8/1985  Bruschtein et al. .................. 523/201

*Primary Examiner*—Joseph L. Schofer
*Assistant Examiner*—J. M. Reddick

[57] ABSTRACT

A process for preparing a structure reinforced latex particle whose film has improved tensile and elongation properties prepared by an emulsion polymerization comprising a three-stage monomer feed addition. The second monomer feed is an amount form about 5 to about 30 parts per hundred parts monomer in said latex particle and is a polymer of which would have a $T_g$ greater than either the first or third monomer feed. The subject structure reinforced latex particle provides A film having improved tensile properties without a corresponding reduction in elongation. A pressure sensitive adhesive formulated with the structure reinforced latex particle is also provided.

10 Claims, 1 Drawing Sheet

STRUCTURE REINFORCED LATEX PARTICLES

CROSS-REFERENCE TO RELATED APPLICATION

This is a divisional of application Ser. No. 759,994, filed July 29, 1985.

BACKGROUND OF THE INVENTION

The present invention is directed towards the preparation of a latex having high tensile strength without a loss in elongation. This improvement in physical properties results in a latex suitable as an adhesive having high shear adhesion without a loss of peel adhesion.

In the adhesive industry there is a great desire for adhesives having a balance of shear and peel adhesion. Unfortunately, shear adhesion is contributed by the tensile property of the latex film and peel adhesion is contributed by the elongation property of the latex film. Tensile and elongation are antagonistic properties and; therefore, increasing one tends to decrease the other. In order to cope with this problem, various methods for preparing latexes have been attempted.

One method, and perhaps most common, is to copolymerize various monomers to obtain the benefit of the individual monomer components. Another polymerization method is to stage the addition of monomers to form a structured latex particle having diverse properties. While either method has produced latexes having properties acceptable for adhesives, especially pressure sensitive adhesives, it is still desirable to increase either shear or peel adhesion without sacrificing the other.

SUMMARY OF THE INVENTION

The present invention is a process for preparing a structure reinforced latex particle whose film has improved tensile and elongation properties prepared by an emulsion polymerization comprising the steps of:

(a) polymerizing a first monomer feed to form a core region, (b) polymerizing in the presence of (a) a second monomer feed, a polymer of which would have a glass transition temperature ($T_g$) greater than (a) in an amount from about 5 to about 30 parts per hundred parts monomer in the latex particle, and (c) polymerizing in the presence of (a) and (b) a third monomer feed, a polymer of which would have a $T_g$ less than (b) to form a shell region.

The $T_g$ of the polymer formed form the (b) monomer feed is generally at least 25° C. In one aspect, the polymer formed from the monomer feeds (a) and (c) have a similar $T_g$ or may, in fact, comprise the same composition. A typical monomer feed for (a) and (c) is a mixture of styrene and butadiene.

In yet another aspect of the process, the monomer feed (b) can be an amount from about 15 to about 25 parts per hundred parts monomer in the latex particle. The monomer feed (b) can be a styrene or a mixture thereof whose polymer would have a $T_g$ greater than 25° C. The addition of the monomer feeds (a), (b) and (c) can be made in a continuous feed manner.

The present invention also provides for a structure reinforced latex particle whose film has improved tensile and elongation properties prepared by the process described above.

In yet another aspect, the present invention provides for a pressure sensitive adhesive comprising a structure reinforced latex particle having improved tensile and elongation properties prepared by an emulsion polymerization process, as described above, and a tackifier. Generally, the tackifier comprises from about 1 to about 90 percent by weight on a solids basis in the pressure sensitive adhesive formulation.

The process of the present invention allows for the preparation of a latex particle having increased tensile properties without a proportional decrease in the elongation properties. Advantageously, the tensile and elongation characteristics of the subject structure reinforced latex particle allows for the preparation of a pressure sensitive adhesive having desirable shear and peel adhesion strengths.

DETAILED DESCRIPTION OF THE INVENTION

Figure 1:
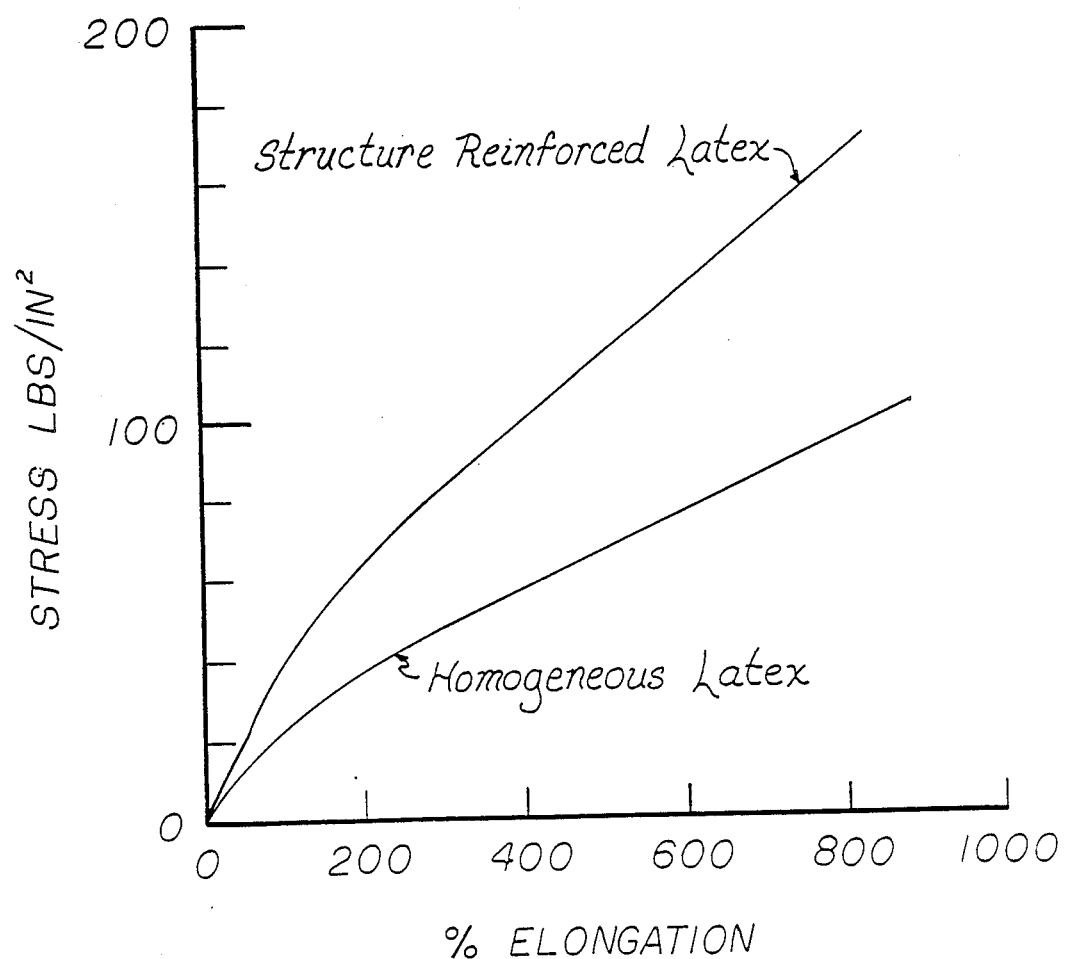
FIG. 1 depicts the stress-strain curve of a structure reinforced latex film and a comparative homogeneous latex film.

The latexes of the subject invention are prepared by a three-stage polymerization process which provides good tensile properties without a corresponding reduction in elongation properties. In the area of adhesives, this characteristic provides excellent shear and peel strengths. The three-stage latex is also suitable for applications as a pressure sensitive adhesive.

Three-stage process is meant to describe a polymerization process where a first monomer feed having one transition temperature ($T_g$) is fed into the reactor followed by a second manner feed having a higher $T_g$ and, finally, a third monomer feed, similar to said first monomer feed, is added to the polymerization system. The polymerization process can be either staged, i.e., each monomer feed individually added and polymerized prior to addition of the subsequent monomer feed or a continuous feed process. The continuous feed process involves the incremental addition of each monomer feed such that as one monomer feed is reduced the subsequent monomer feed is increased to provide a smooth transition between various monomer feeds.

The reinforcing portion of the subject reinforced structured latex particles is contributed by the second monomer feed in the present three-stage polymerization. The second monomer feed, having a $T_g$ higher than the first and third monomer feeds, is generally referred to as the hard monomer. Generally, the hard monomer has a $T_g$ in excess of that temperature for which the latex is to be employed. Therefore, in a pressure sensitive adhesive (hereinafter, PSA) the hard monomer feed would have a $T_g$ greater than about 25° C.

The second monomer feed, or hard monomer portion of the latex particle, reinforces the first and third monomer portions to provide the novel balance of tensile and elongation properties. The reinforcement of the first and third stage monomer is observed when the second monomer feed comprises from about 5 to about 30 parts per hundred parts total monomer (hereinafter, phr) of the latex particle. More preferably, the second monomer feed or hard monomer comprises from about 10 to about 25 phr.

Typical candidates for the second monomer feed, or hard monomer, are vinyl aromatic monomers whose polymers have a $T_g$ greater than about 25° C., such as styrene and copolymers thereof. However, homopolymers or copolymers having a $T_g$ higher than the first and third stage monomer feeds and higher than the temperature at which the latex is to be employed are suitable. Other suitable hard polymers are styrene/butadiene copolymers, styrene/isoprene copolymers, methylmethacrylate, copolymers or terpolymers of methylmethacrylate with ethylacrylate, butylacrylate, 2-ethylhexylacrylate, sec-butylacrylate or butadiene, copolymers or terpolymers of acrylonitrile with ethylacrylate, butylacrylate or butadiene.

The first and third stage monomer feeds, or soft monomers, are generally of the same composition; however, variation in monomer content and monomer type is suitable provided the $T_g$ does not exceed that of the second monomer feed. The first and third monomer feeds, or soft monomers, have a $T_g$ less than said second monomer feed or hard monomer. Typically, the soft monomer has a $T_g$ less than about 25° C. Suitable soft polymers can include styrene/butadiene copolymers having a $T_g$ of less than 25° C., copolymers or terpolymers of styrene with isoprene, butylacrylate or 2-ethylhexylacrylate, copolymers or terpolymers of acrylonitrile with butadiene, isoprene, butylacrylate, 2-ethylhexylacrylate, sec-butylacrylate, ethylacrylate, butylacrylate, and other soft polymers having a $T_g$ less than the second stage monomer feed.

The first and third monomer feeds comprise the remainder of the latex particle, i.e., that portion not formed by the reinforcing second monomer feed. Generally, the first monomer feed comprises from about 10 to about 30 parts per one hundred parts total monomer and the third monomer feed comprises from about 40 to 70 parts per one hundred parts total monomer of the latex particle.

The polymerization of the three monomer feeds is conducted pursuant to conventional emulsion polymerization techniques. Thus, for example, the monomers to be employed for the particular stage involved are typically dispersed with agitation sufficient to emulsify the mixture in an aqueous medium which may contain known emulsifying agents (i.e., surfactants) as well as other ingredients conventionally employed in the art as polymerization aids (e.g., conventional chain transfer agents, etc.). Such monomers are then subjected to polymerization with the aid of a conventional source for generating free radicals, such as conventional free radical polymerization catalyst, activating radiation, etc.

Optionally, conventional seeding procedures can be employed in the first stage polymerization to aid in the control of such polymerization and to achieve the desired average particle size and particle size distribution for the dispersed first stage copolymer particles. Also, as has been noted, conventional chain transfer agents can be employed in the practice of the present invention and, indeed, in polymerization stages employing aliphatic conjugated dienes it is preferable to do so. Examples of such conventional chain transfer agents include bromoform, carbon tetrachloride, long chain mercaptans (e.g., dodecylmercaptans, etc.), or other known chain transfer agents. Conventional amounts in general, from about 0.1 to about 10 weight percent based on total monomer charge of such chain transfer agents are typically employed in such preferred embodiments. In addition, it is sometimes desirable to have small amounts of certain known additives incorporated into the latex. Typical examples of such additives are surfactants, bacteriocides, neutralents, anti-foamers, etc. Such additives can be incorporated into the latex of the invention in a conventional manner and at any convenient point in the preparation of such latexes.

The reinforced latexes of the present invention are suitable for use in a variety of applications such as in carpet backsizing, as binders and paper coating compositions, as binders in other compositions, as adhesives for binding together various types of substrates as free films, as film-forming components for protective or decorative coatings, in general paints and the like. The subject reinforced latexes are particularly desirable for use as pressure sensitive adhesives. The pressure sensitive adhesives (PSA) are adhesive materials, which when dried, possess a lasting aggressive tack which enables them to tenaciously adhere to a wide variety of substrates when applied with only a light pressure. These adhesives are useful in a variety of applications including tapes, labels, wall coverings, floor tiles, and wood veneers.

The subject reinforced latex composition is particularly suitable for use as a pressure sensitive adhesive in view of the excellent shear and peel adhesion properties. Generally, when employing the subject latex composition as a pressure sensitive adhesive, it is desirable to include a tackifying resin emulsion or tackifier. Tackifying resins useful in the preparation of pressure sensitive adhesives are commercially available and are generally disclosed in U.S. Pat. No. 4,189,419, herein incorporated by reference.

Typically, the resins comprise emulsified resin, partially decarboxylated rosin, glycerol ester of polymerized rosin, partially dimerized rosin, natural resin, hydrogenated wood rosin, plasticized hydrogenated rosin, aliphatic hydrocarbon resins derived from petroleum, aromatic resins derived from petroleum, terpene resins, coal tar, polyindene resins, ethylene vinylacetate copolymer resins, terpene phenolics, coumarone-indenes, rosin esters, pentaerythritol esters, polydicyclobutadiene resins. The properties of the PSA composition can be varied for a particular application by the selection of an appropriate tackifying resin.

Naturally, the particular tackifiers employed can contain conventional additives, such as softeners, plasticizers, antioxidants and the like which can be emulsified along with the tackifying resin or emulsified separately and mixed with the tackifying resin emulsion.

Tackifiers are desirably added in an mount such that the latex is given additional tack (quick stick and peel adhesion) without detracting unduly from the shear adhesion. Suitable formulations will typically have from about 1 to about 90 percent, preferably about 20 to about 80 percent, and more preferably, from about 30 to about 50 percent by weight on a solids basis tackifier in the formulation.

Typically, the PSA composition can be prepared by blending the desired amount of reinforced latex and tackifier in any conventional manner. It is understood that no requirement or limitation to the scope of the invention is intended as to how the latex and tackifier components are combined.

The following examples are provided to illustrate specific embodiments of the present invention.

EXAMPLE I

A three-staged structure reinforced latex was prepared as follows. All measurements are in parts per one hundred parts total monomer unless otherwise indicated.

The monomeric changes were added to an initial mixture consisting of 55.99 parts deionized water, 3.5 parts of a polystyrene seed latex to produce a latex of about 1000 Å. The initial mixture was agitated and the temperature was maintained at 90° C. To this initial mixture an aqueous charge was added at time zero and continued until time 270 minutes consisting of 200 parts deionized water, 0.5 part of 45 percent solution of Dowfax ®-2A1 surfactant (trademark of The Dow Chemical Comapny for sodium dodecyl diphenyl oxide disulfonate) and 0.7 parts of sodium persulfate. From time zero to 54 minutes, the first monomer feed consisting of 5.6 parts styrene, 14 parts butadiene, 0.45 parts t-dodecyl mercaptan and 0.6 parts carbon tetrachloride was added.

The second monomer feed consisting of 20 parts styrene was commenced at 54 minutes and continued until time 107 minutes.

The third monomer feed was commenced at time 107 minutes and continued until time 270 minutes. The third monomer feed consisted of 16.4 parts styrene, 42 parts butadiene, 0.35 parts t-dodecylmercaptan and 1.8 parts carbon tetrachloride.

In addition, at time 15 minutes and continuing until time 210 minutes, a second aqueous charge consisting of 20.15 parts deionized water, 0.14 parts of a 10 percent solution of sodium hydroxide and 2.0 parts itaconic acid was continuously added to the reaction mixture.

At time 270 minutes all additions were completed and the mixture was cooked down for 60 minutes. The solids were collected, latex films prepared and the physical properties measured. The results of these measurements are shown in Table I.

A conventional homogeneous styrene/butadiene latex was also prepared as a comparison. The comparative homogeneous latex was prepared by a continuous feed process using 70 parts butadiene, 28 parts styrene, 2 parts itaconic acid, 2.25 parts t-dodecyl mercaptan and 3 parts carbon tetrachloride with all other ingredients and conditions being essentially equal to the three-stage latex preparation. Naturally, the structure reinforced latex formulation contains more styrene than the homogeneous latex due to the intermediate charge of reinforcing styrene. Essentially, the structure reinforced latex as prepared above consists of a first monomer charge equivalent to 20 percent of the comparative homogeneous latex monomer feed, followed by 20 percent reinforcing styrene monomer charge, and finally a third monomer charge equivalent to 60 percent of the comparative homogeneous latex monomer feed.

The physical properties for the film prepared from the homogeneous latex are included in Table I as the comparative homogeneous latex.

The adhesive properties of the latexes were measured according to Pressure Sensitive Tape Council (PSTC) Procedure Nos. 1, 5, and 7. The peel adhesion test involves peeling the tape off at a 180 degree angle after application under relatively heavy pressure. The quick stick test involves peeling the tape off at a 90 degree angle after application under a relatively light pressure. Both tests are reported as the force required to remove the tape. Shear adhesion is measured according PSTC No. 7 using a 500 gram (g) mass at a 120° F. In this test, a shear force 2 degree angle is applied in an oven. The results are reported as the time required for the bond to fail.

| Property | Structure Reinforced Latex | Comparative Homogeneous Latex |
| --- | --- | --- |
| Tensile (psi) | 173 | 98 |
| Elongation (%) | 827 | 865 |
| Shear Adhesion (hrs) | >100 | 58.2 |
| Peel Adhesion (lbs/in) Film | 1.9 | 1.9 |
| Stainless Steel | 1.6 | 1.3 |
| Quick Stick (lbs/in) | 1.0 | .8 |

The physical data above shows an increase in tensile properties without a corresponding loss in elongation for the structure reinforced latex. The gain in tensile is demonstrated by the excellent improvement in shear adhesion with no loss in peel adhesion when compared to the homogeneous latex.

The stress-strain curves for films formed from the structure reinforced latex and comparative homogeneous latex of Example I are depicted in FIG. 1. FIG. 1 indicates the improved stress properties of the subject structure reinforced latex while maintaining good elongation comparable to the homogeneous latex. Generally, one would expect an increase in tensile stress, i.e., to cause an increase in the slope of a line graphing stress versus elongation.

Table I shows the peel adhesion (a function of elongation) and shear adhesion (a function of tensile) for the structure reinforced latex of Example I versus the comparative homogeneous latex. The latexes are shown neat and with varying tackifier levels. Pressure Sensitive Tape Council Test Nos. 1 and 7 were employed for conducting the peel adhesion and shear adhesion tests, respectively.

TABLE I

| Latex/ Tackifier* | 180° Peel Adhesion (lb/in) | | 500 g Shear Adhesion (Hrs) | |
| --- | --- | --- | --- | --- |
| | Homogeneous Latex | Structured Reinforced latex | Homogeneous Latex | Structure Reinforced Latex |
| 100/0 | 1.3 | 1.6 | 58.2 | >100 |
| 90/10 | 0.9 | 2.3 | 3.9 | >100 |
| 80/20 | 1.7 | 2.1 | 2.35 | 37.15 |
| 70/30 | 2.1 | 1.4 | 1.7 | 16.85 |

*Pentalyn H-55WBX ® (Trademark of Hercules, Inc. for a polyethylene ester of a partially hydrogenated rosin).

The data indicate that the structure reinforced latex particle maintained good peel adhesion while dramatically increasing the tensile related property of static sheet.

EXAMPLE II

A three-staged latex, structure reinforced latex particle, was prepared following the procedure outlined in Example I. All measurements are in parts per one hundred parts total monomer unless otherwise indicated.

The first and third monomer feeds, or soft monomer feeds, were identical and consisted of 56 butadiene, 22 styrene, 2.2 t-dodecyl mercaptan and 2.4 carbon tetrachloride. The monomer feed was added from time zero to 54 minutes and from 107 to 270 minutes to form the soft regions of the structured latex particle.

The second monomer feed, or hard monomer feed, consisted of 20 styrene and was added from 54 to 107 minutes to form the hard reinforcing region of the structured latex particle. Thus, the total monomer feed for the structure reinforced latex consisted of 20 percent soft monomer followed by 20 percent reinforcing styrene and finally 60 percent soft monomer feed. All other polymerization conditions were similar to Example I.

For comparison purposes a homogeneous latex was prepared by a continuous feed process as described in Example 1 but with increased chain transfer agent, i.e., 2.75 parts t-dodecyl mercaptan. Each latex was tested neat and with varying tackifier levels as in Example I for peel adhesion and shear adhesion. The values are reported in Table II.

TABLE II

| Latex/Tackifier* | 180° Peel Adhesion (lb/in) | | 500 g Shear Adhesion (Hrs) | |
|---|---|---|---|---|
| | Homogeneous Latex | Structured Reinforced latex | Homogeneous Latex | Structure Reinforced Latex |
| 100/0 | 0.9 | 1.5 | 1.55 | 15.65 |
| 90/20 | 1.2 | 1.4 | 0.67 | 8.0 |
| 80/20 | 3.1 | 2.2 | 0.57 | 7.6 |
| 70/30 | 3.5 | 4.8 | 0.4 | 6.9 |

*Pentalyn H-55WBX ® (Trademark of Hercules, Inc. for a polyethylene ester of a partially hydrogenated rosin).

The values indicate that the structure reinforced latex particle had markedly improved tensile related property of static shear while maintaining approximately equal elongation related property of peel adhesion. It is also noted that the increase in chain transfer agent between Examples I and II has softened the latex particle which has accordingly resulted in lower tensile related values.

EXAMPLE III

A three-staged latex, structure reinforced latex particle, was prepared as in Example II except that the amount of chain transfer agent present in the first and third monomer feeds, or soft monomer feeds, was increased from 2.2 part t-dodecyl mercaptan to 2.6 parts. All other additions and monomer feed sequences were similar to Example II.

A comparative homogeneous latex particle was also prepared having the increased chain transfer agent, i.e., 3.25 parts t-dodecyl mercaptan. Each latex was tested neat and with varying tackifier levels as in Examples I and II for peel adhesion and shear adhesion. The values are reported in Table III.

TABLE III

| Latex/Tackifier* | 180° Peel Adhesion (lb/in) | | 500 g Shear Adhesion (Hrs) | |
|---|---|---|---|---|
| | Homogeneous Latex | Structured Reinforced latex | Homogeneous Latex | Structure Reinforced Latex |
| 100/0 | 1.7 | 1.4 | 0.08 | 15.3 |
| 90/10 | 1.6 | 1.3 | 0.06 | 3.0 |
| 80/20 | 1.9 | 2.3 | 0.05 | 3.1 |
| 70/30 | 2.3 | 4.8 | 0.03 | 3.35 |

*Pentalyn H-55WBX ® (Trademark of Hercules, Inc. for a polyethylene ester of a partially hydrogenated rosin).

The values again indicate as in Examples I and II that the structure reinforced latex has improved tensile related properties of shear adhesion while maintaining the elongation related property of peel adhesion. Also Examples II and III demonstrate the effect of increasing chain transfer agent which has a tendency to soften the latex particles thus reducing tensile properties.

What is claimed is:

1. A pressure sensitive adhesive comprising:
   (i) a structure reinforced latex particle having improved tensile and elongation properties prepared by an emulsion polymerization comprising:
      (a) polymerizing a first monomer feed to form a core region;
      (b) polymerizing in the presence of said (a) a second monomer feed, a polymer of which would have a $T_g$ greater than (a), in an amount from about 5 to about 30 parts per hundred parts monomer in said latex particle to form an intermediate layer;
      (c) polymerizing in the presence of (a) and (b) a third monomer feed, a polymer of which would have a $T_g$ less than said (b), to form a shell region whereby a structure reinforced latex particle is produced having a soft polymer core, a hard polymer intermediate layer and a soft polymer shell; and
   (ii) a tackifier.

2. The pressure sensitive adhesive of claim 1 wherein said addition of monomer feeds (a), (b) and (c) are made in a continuous feed manner.

3. The pressure sensitive adhesive of claim 1 where a polymer formed from said (b) would have a $T_g$ greater than about 25° C.

4. The pressure sensitive adhesive of claim 1 where a polymer formed from said monomer feeds (a) and (c) would have the same $T_g$.

5. The pressure sensitive adhesive of claim 4 where said monomer feeds (a) and (c) are the same composition.

6. The pressure sensitive adhesive of claim 4 where said $T_g$ is less than 25° C.

7. The pressure sensitive adhesive of claim 1 where said monomer feeds (a) and (c) are a mixture of styrene and butadiene.

8. The pressure sensitive adhesive of claim 1 where said second monomer feed (b) is in an amount from about 15 to about 25 parts per hundred parts monomer in said latex particle.

9. The pressure sensitive adhesive of claim 1 where said monomer feed (b) is styrene or a monomer mixture thereof whose polymer would have a $T_g$ greater than 25° C.

10. The pressure sensitive adhesive of claim 1 where said tackifier comprises from about 1 to about 90 percent by weight on a solids basis in the pressure sensitive adhesive formulation.

* * * * *

UNITED STATES PATENT AND TRADEMARK OFFICE
CERTIFICATE OF CORRECTION

PATENT NO. : 4,742,108

DATED : May 3, 1988

INVENTOR(S) : Ashok C. Makati, Mezzie L. Ash, and Do Ik Lee

It is certified that error appears in the above-identified patent and that said Letters Patent is hereby corrected as shown below:

On the title page:

Abstract, line 5, "form" should be --from--.

Abstract, line 9, "A" should be --a--.

Column 1, line 58, "be a styrene" should be --be styrene--.

Column 2, line 32, "manner" should be --monomer--.

Column 4, line 47, "an mount" should be --an amount--.

Column 5, line 1, "changes" should be --charges--.

Column 7, line 18, "90/20" should be --90/10--.

Signed and Sealed this

Seventh Day of February, 1989

Attest:

DONALD J. QUIGG

*Attesting Officer*    *Commissioner of Patents and Trademarks*